(12) United States Patent
Yang

(10) Patent No.: US 8,950,298 B2
(45) Date of Patent: Feb. 10, 2015

(54) DEVICE FOR ASSEMBLING AND DISASSEMBLING AN OIL FILTER TANK

(71) Applicant: Hsin-Hung Yang, Taichung (TW)

(72) Inventor: Hsin-Hung Yang, Taichung (TW)

( * ) Notice: Subject to any disclaimer, the term of this patent is extended or adjusted under 35 U.S.C. 154(b) by 276 days.

(21) Appl. No.: 13/662,778

(22) Filed: Oct. 29, 2012

(65) Prior Publication Data

US 2014/0026721 A1   Jan. 30, 2014

(30) Foreign Application Priority Data

Jul. 25, 2012  (TW) .............................. 101214367 U

(51) Int. Cl.
*B25B 13/18* (2006.01)

(52) U.S. Cl.
USPC ............................................ 81/128; 81/176.3

(58) Field of Classification Search
USPC ................ 81/128, 90.3, 91.3, 3.42, 176.3, 60
See application file for complete search history.

(56) References Cited

U.S. PATENT DOCUMENTS

| 3,119,290 | A  | * | 1/1964 | Ivie    | 81/128 |
| 6,862,957 | B2 | * | 3/2005 | Wang    | 81/91.3 |
| 2002/0017171 | A1 | * | 2/2002 | Chang | 81/133 |
| 2004/0182207 | A1 | * | 9/2004 | Wu    | 81/128 |
| 2007/0131067 | A1 | * | 6/2007 | Wu    | 81/128 |

* cited by examiner

*Primary Examiner* — Hadi Shakeri
(74) *Attorney, Agent, or Firm* — C. G. Mersereau; Nikolai & Mersereau, P.A.

(57) ABSTRACT

A device for assembling and disassembling an oil filter tank has a clamp module, a base plate, two elbow plates, two restricting elements, and a rotating base. The clamp module has a pair of clamp plates. Each clamp plate has a slipping portion, and the slipping portion has a restricting hole. The base plate is mounted on the clamp plates. The elbow plates are pivotally mounted on the slipping portions respectively. The restricting elements are inserted slidably in the restricting holes respectively and are fixed on the base plate. The rotating base is pivotally mounted on the elbow plates and has an adapter. When the clamp plates are separated from each other, the restricting elements can ensure that the clamp plates move parallelly, such that stability and strength of the device can be enhanced.

18 Claims, 8 Drawing Sheets

DEVICE FOR ASSEMBLING AND DISASSEMBLING AN OIL FILTER TANK

BACKGROUND OF THE INVENTION

1. Field of the Invention

The present invention relates to a maintenance tool of a motor vehicle, and more particularly to a device for assembling and disassembling an oil filter tank.

2. Description of Related Art

An oil filter tank is assembled in an engine chamber of a motor vehicle to filter impurity from the engine oil and to ensure a lubricating effect of the engine oil. The oil filter tank has to be replaced after a period of use to avoid the decreasing lubricating effect of aged engine oil from causing wear and tear of the engine of the motor vehicle.

The oil filter tank cannot be disassembled directly but requires a conventional device for assembling and disassembling the oil filter tank. The conventional device for assembling and disassembling an oil filter tank has two clamp plates, two springs, and a rotating base. The springs are connected with the clamp plates and are on two sides of the clamp plates respectively to make the clamp plates approach or separate from each other. The rotating base is mounted on the clamp plates and the rotating base can control the clamp plates by connecting with a wrench. In use, the clamp plates are separated from each other to clamp an oil filter tank tightly, and the wrench is connected with the rotating base to control the clamp plates and to rotate the oil filter tank, and then the oil filter tank can be assembled on the engine of the motor vehicle by the device.

However, the conventional device for assembling and disassembling an oil filter tank has the following shortcomings in use:

1. The clamp plates are moved only with the force provided by the springs, and the clamp plates are easily moved in non-parallel travels to cause malpositioning of the clamp plates. In addition, the springs suffer elastic fatigue after a period of use.

2. The oil filter tank is assembled on the bottom of the motor vehicle, and the wrench has to be pivoted in a reverse direction for assembling the oil filter tank onto the vehicle. However, when the device is rotated in the reverse direction, the clamp plates may detach from the oil filter tank, and this is inconvenient in use.

To overcome the shortcomings of the conventional device, the present invention provides a device for assembling and disassembling an oil filter tank to mitigate or obviate the aforementioned problems.

SUMMARY OF THE INVENTION

The main object of the present invention is to provide an improved device for assembling and disassembling an oil filter tank, which comprises a clamp module, a base plate, two first restricting elements, two elbow plates, and a rotating base.

The clamp module has two clamp plates, a clamping space, and at least one spring. Each clamp plate has a clamp portion, a slipping portion, and a restricting hole, wherein the clamp portions of the clamp plates face each other, each slipping portion is elongated and connected with an end of the clamp portion, wherein the slipping portions of the clamp plates parallelly extend and abut each other, and each restricting hole is formed in and along a longitude of the slipping portion. The clamping space is formed between the clamp portions, and the at least one spring is connected between the clamp plates, and a longitude of the at least one spring is parallel with the longitude of one of the slipping portions, and the clamp portions abut each other by a force provided by the at least one spring.

The base plate is mounted on the clamp plates at a position opposite to the clamping space and has two first holes, wherein each first hole aligns with a middle segment of one of the restricting holes when the slipping portions abut each other.

Each first restricting element is fixed in one of the first holes, inserted slidably in a corresponding one of the restricting holes, and is engaged with a corresponding one of the slipping portions.

The elbow plates are elongated and pivotally connected with the slipping portions respectively, and each elbow plate has a driving end pivotally connected to a corresponding one of the slipping portions, and a pivoted end opposite to the driving end.

The rotating base is pivotally connected with the pivoted ends of the elbow plates and has an adapter mounted on a side of the rotating base at a position opposite to the elbow plates.

The base plate further has two second holes, wherein each second hole is aligned with one of the restricting holes and corresponds to one end of a corresponding one of the restricting holes when the slipping portions abut each other; two second restricting elements are inserted slidably in the restricting holes, respectively abut the slipping portions, and are fixed in the second holes respectively.

Each clamp portion has a clamp edge mounted on the clamp portion at a position opposite to the slipping portions, and the clamp plates further have at least one gripping plate mounted on one of the clamp edges.

The first restricting elements are aligned in the restricting holes respectively, such that the clamp plates will approach or separate parallelly to maintain stability of the structure of the present invention. The elastic fatigue of the springs will be alleviated because the clamp plates have further restricting effect provided by the restricting holes and the first restricting elements.

Other objects, advantages, and novel features of the invention will become more apparent from the following detailed description when taken in conjunction with the accompanying drawing.

DETAILED DESCRIPTION OF PREFERRED EMBODIMENT

Figure 1:
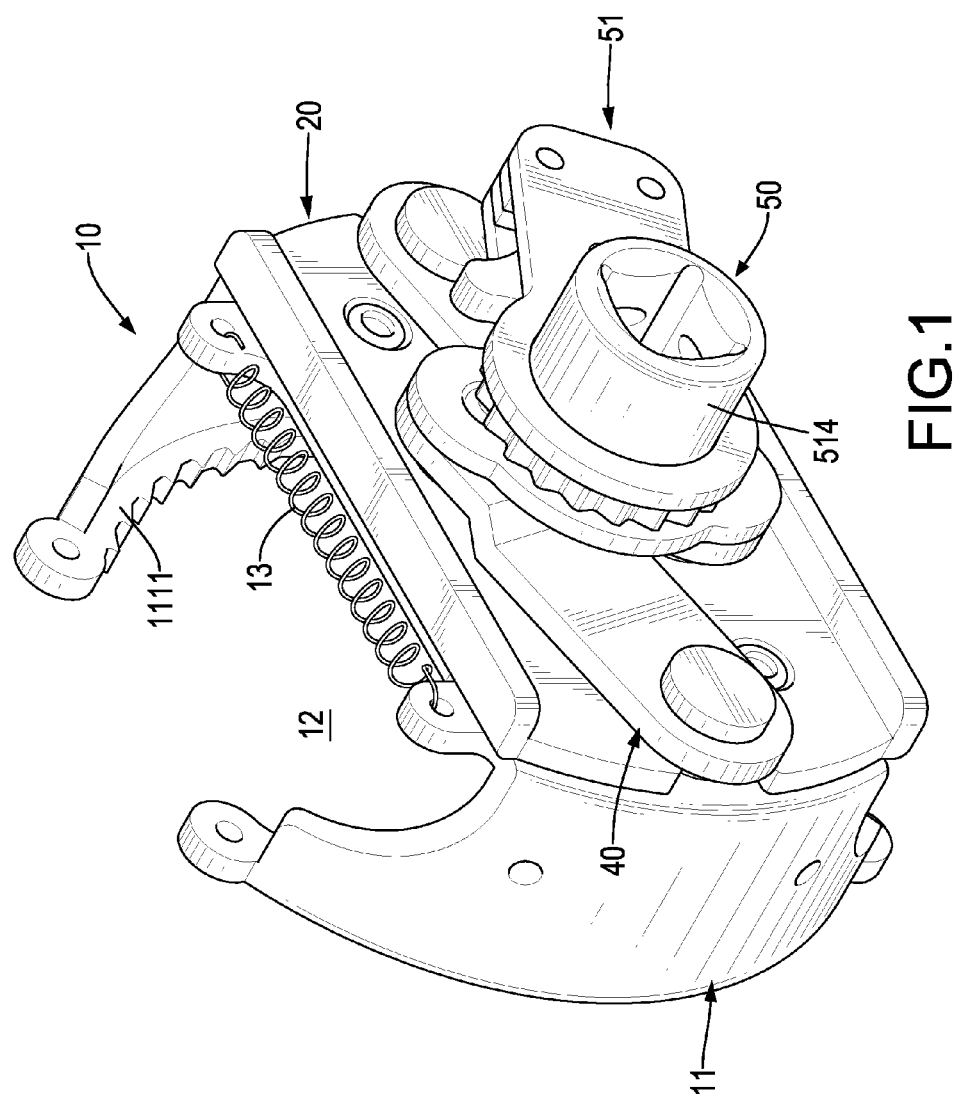
FIG. 1 is a perspective view of a first preferred embodiment of a device for assembling and disassembling an oil filter tank in accordance with the present invention.
Figure 2:
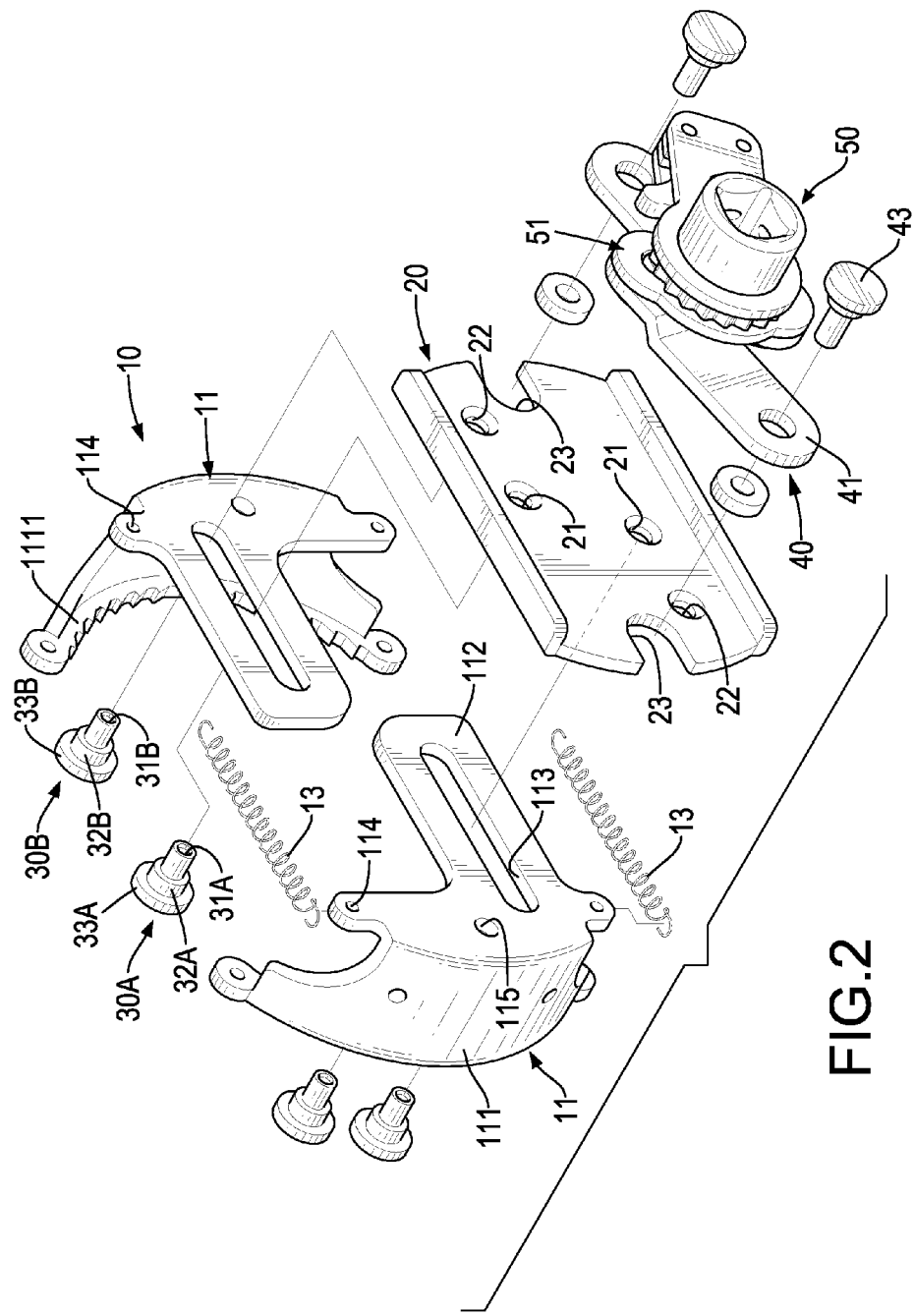
FIG. 2 is a partially exploded perspective view of the device in FIG. 1.
Figure 3:
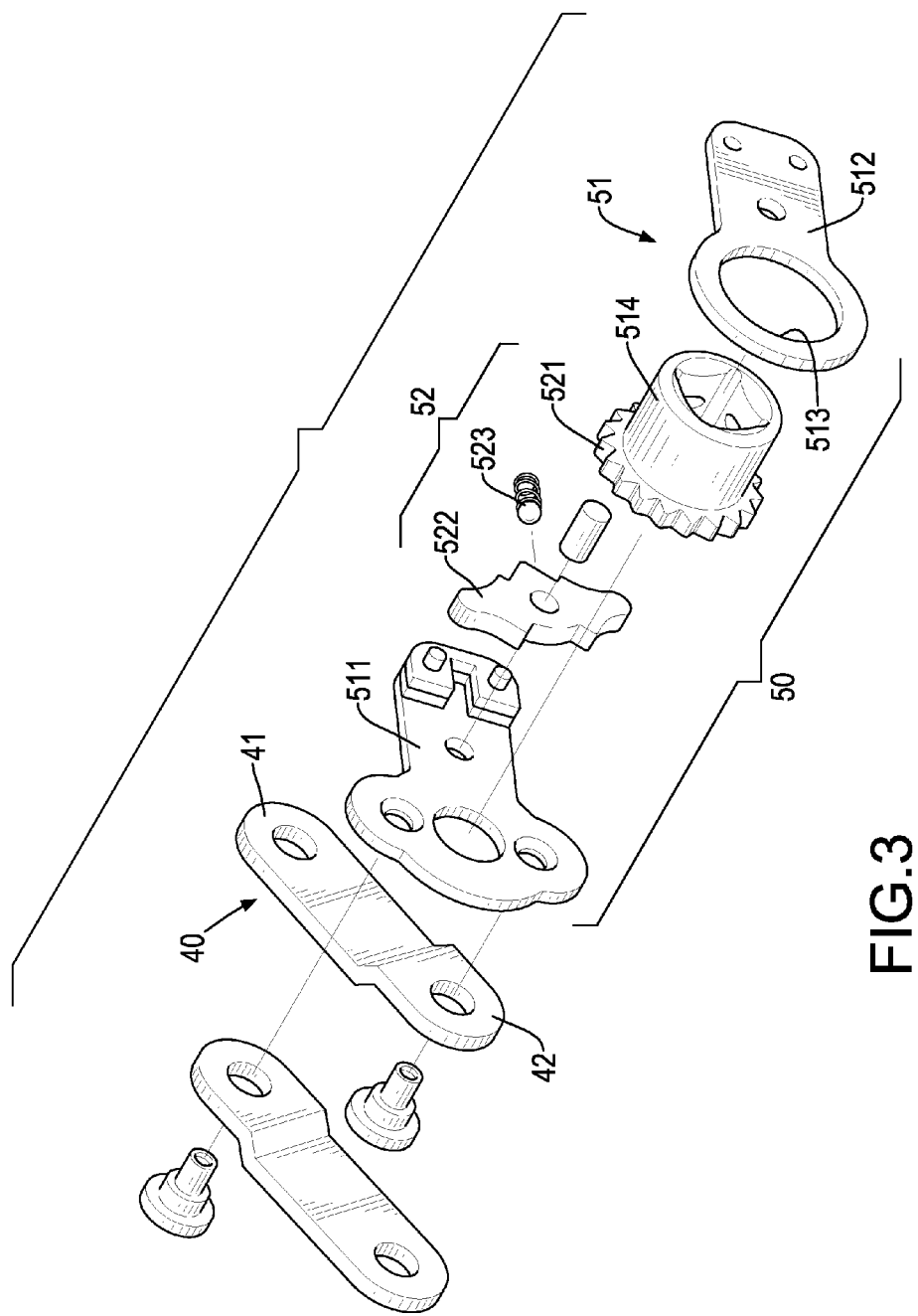
FIG. 3 is an exploded perspective view of a rotating base of the device in FIG. 1.

With reference to FIGS. 1 to 3, a first preferred embodiment of a device for assembling and disassembling an oil filter tank in accordance with the present invention comprises a clamp module 10, a base plate 20, two first restricting elements 30A, two second restricting elements 30B, two elbow plates 40, and a rotating base 50.

The clamp module 10 has two clamp plates 11, a clamping space 12, and at least one spring 13. Each clamp plate 11 is bent from a metal sheet and has a clamp portion 111, a slipping portion 112, a restricting hole 113, two connected portions 114, and a combining hole 115. The clamp portion 111 is curved, faces the clamp portion 111 of the other clamp plate 11, and has two ends and a clamp edge 1111 being toothed and protruding from an end of the clamp portion 111. The distance between the clamp portions 111 of the clamp plates 11 is smaller than a diameter of an oil filter tank, so the clamp portions 111 have to be separated from each other to clamp the oil filter tank.

The slipping portion 112 is elongated and is connected with the other end of the clamp portion 111. A first width of the slipping portion 112 adjacent to the clamp portion 111 is wider than a second width of the slipping portion 112 opposite to the clamp portion 111. The restricting hole 113 is formed in and along the slipping portion 112. The connected portions 114 protrude from two sides of the slipping portion 112, and face respectively the connected portions 114 on the other clamp plate 11. The combining hole 115 is formed on the slipping portion 112 and is adjacent to the clamp portion 111.

The clamping space 12 is formed between the clamp plates 11. Preferably, the clamping space 12 is formed between the clamp portions 111 of the clamp plates 11. The at least one spring 13 is connected between the clamp plates 11. Preferably, two springs are implemented. Each spring 13 is connected between the connected portions 114 that face each other on the clamp plates 11.

The base plate 20 is flat and is mounted on the clamp plates 11 at a position opposite to the clamping space 12. Preferably, the base plate 20 is mounted on the sides of the slipping portions 112 and has two first holes 21, two second holes 22, and two bolt edges 23. The first holes 21 are formed in the base plate 20 and align with the restricting holes 113 respectively. When the slipping portions 112 abut each other, the first holes 21 are located on the middle segments of the restricting holes 113 respectively. The second holes 22 are formed in the base plate 20 and align with the restricting holes 113 respectively. When the slipping portions 112 abut each other, the second holes 22 are located on the ends of the restricting holes 113 adjacent to the corresponding clamp portions 111 respectively. The bolt edges 23 are formed on two ends of the base plate 20 and correspond to and align with the combining holes 115 respectively.

The first restricting elements 30A are slidably mounted on the clamp plates 11 respectively, preferably are slidably mounted in the restricting holes 113 respectively and are connected securely to the base plate 20. Each first restricting element 30A is inserted in one of the restricting holes 113 and a corresponding one of the first holes 21. Each second restricting element 30B is inserted in one of the second holes 22 and a corresponding one of the restricting holes 113. Each of the first restricting elements 30A and the second restricting elements 30B has a combined segment 31A, 31B, a restricting segment 32A, 32B, and an abutting segment 33A, 33B. The combined segment 31A, 31B is riveting in a corresponding one of the holes 21, 22. The restricting segment 32A, 32B is connected with one end of the combined segment 31A, 31B and is inserted slidably in the corresponding restricting holes 113. The abutting segment 33A, 33B is connected with one end of the restricting segment 32A, 32B and abuts on the corresponding slipping portion 112 and is located on the side of the corresponding slipping portion 112 at a position opposite to the base plate 20. When the clamp plates 11 are separated from each other, the slipping portions 112 will moved parallelly because the abutting segments 33A, 33B are confined in the restricting holes 113 respectively.

The elbow plates 40 are mounted on the base plate 20 at a side opposite to the clamp module 10 and each elbow plate 40 has a driving end 41 and a pivoted end 42. The driving end 41 is formed on one end of the elbow plate 40, and the pivoted end 42 is formed on the other end of the elbow plate 40. The driving end 41 is pivotally connected with one of the combining holes 115 by a combining bolt 43.

The rotating base 50 is pivotally mounted on the elbow plates 40 at a side opposite to the base plate 20 and has an adapter 51 and a ratchet wheel module 52. The adapter 51 has a first clamp plate 511, a second clamp plate 512, an adapter hole 513, and an adapter portion 514. The first clamp plate 511 has a first end and a second end. The first end of the first clamp plate 511 is pivotally connected to the pivoted ends 42 of the elbow plates 40, and the pivoted ends 42 are connected respectively with two different positions on the first end of the first clamp plate 511, such that the first clamp plate 511 can be pivoted at the center between the pivoted ends 42. The second clamp plate 512 has a first end and a second end. The second end of the second clamp plate 512 is connected to the second end of the first clamp plate 511. The adapter hole 513 is formed in the first end of the second clamp plate 512. The adapter portion 514 is rotatably mounted in the adapter hole 513, and the adapter portion 514 can be connected with a wrench. The ratchet wheel module 52 is mounted between the first clamp plate 511 and the second clamp plate 512 and has a ratchet wheel 521, a brake pad 522, and a supporting element 523. The ratchet wheel 521 is mounted on an end of the adapter portion 514. The brake pad 522 is mounted on the first clamp plate 511, is toothed and engages the ratchet wheel 521 at a suitable angle, such that the ratchet wheel 521 can only rotate in a unidirectional manner. The supporting element 523 is mounted between the second end of the first clamp plate 511 and the second end of the second clamp plate 512. An end of the supporting element 523 abuts the brake pad 522, and the other end of the supporting element 523 is connected with the first clamp plate 511.

Figure 4:
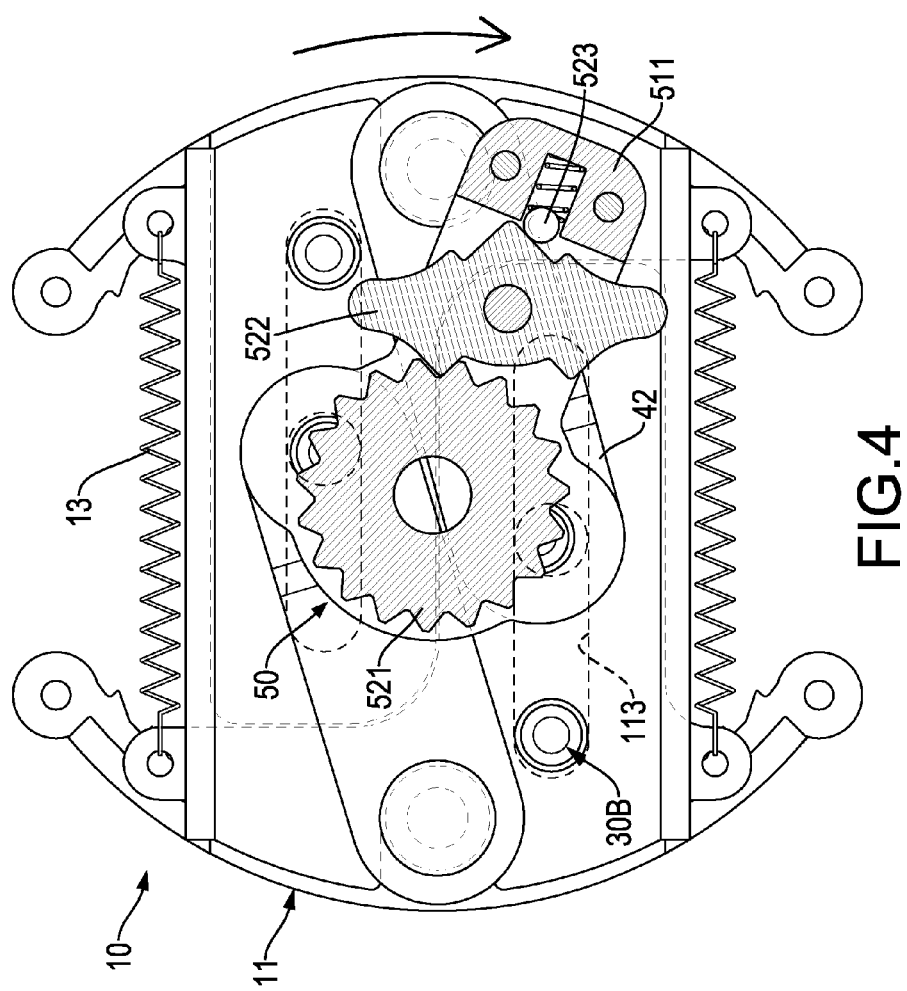
FIG. 4 is an operational front view of the device in FIG. 1 showing the device being rotated clockwise.

With reference to FIGS. 1 and 4, to clamp an oil filter tank, the clamp plates 11 are separated from each other manually. A wrench is connected with the adapter portion 514, and the adapter portion 514 is rotated clockwise. The brake pad 522 engages the ratchet wheel 521 at a suitable angle, the ratchet wheel 521 is locked on the brake pad 522, the brake pad 522 is locked on the supporting element 523, the supporting element 523 is locked on the first clamp plate 511, the first clamp plate 511 is mounted on the pivoted ends 42, and the elbow plates 40 are mounted on the clamp plates 11, such that a force driving the wrench clockwise can be transferred to the clamp plates 11 to rotate the oil filter tank, and the oil filter tank will be assembled onto a motor vehicle.

Figure 5:
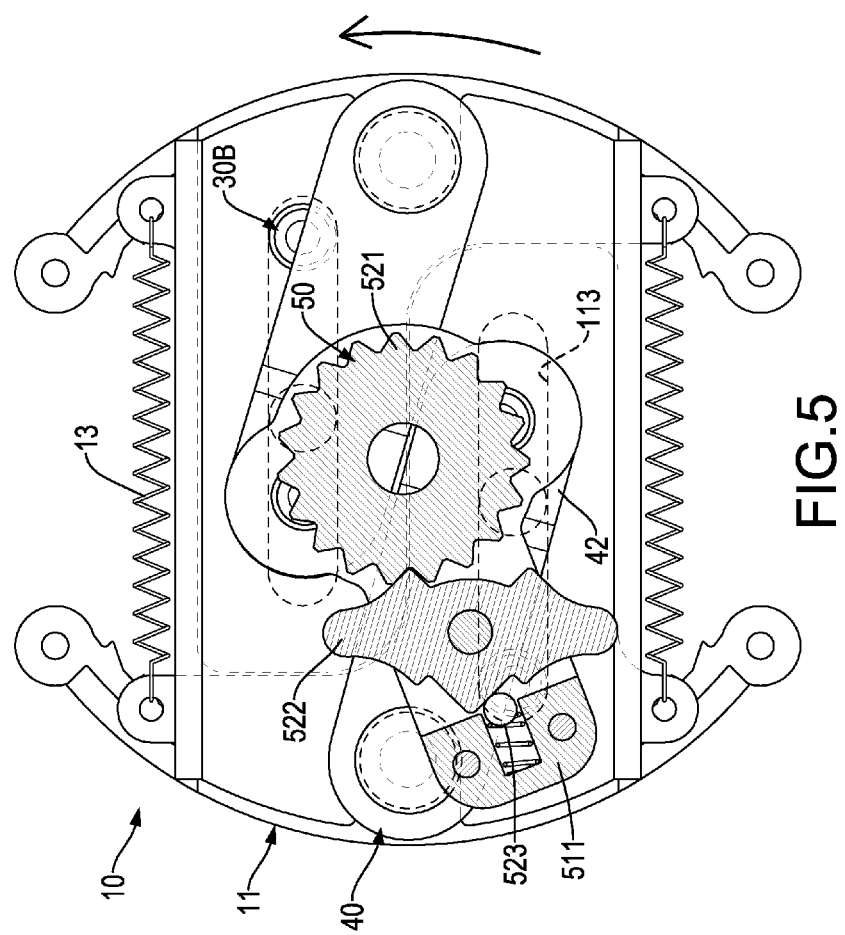
FIG. 5 is an operational front view of the device in FIG. 1 showing the device being rotated counterclockwise.

With reference to FIGS. 4 and 5, to rotate the clamp module 10 in a reverse direction, the brake pad 522 is pushed to pivot and engage the ratchet wheel 521 at a different angle and locked on the supporting element 523, such that the ratchet wheel 521 is kept from rotating counterclockwise. The rotating base 50 is rotated counterclockwise, and then the elbow plates 40 drive the clamp plates 11 to separate from each other. When each first restricting element 30A touches the end of the corresponding restricting hole 113, the distance between the clamp plates 11 is at the maximum. Then, the clamp plates 11 approach each other until the slipping portions 112 abut each other as shown in FIG. 5. With reference to FIG. 5, as the wrench is connected with the adapter portion 514 and rotates the rotating base 50 counterclockwise, the force can be transferred to the clamp plates 11 to rotate the oil filter tank through the brake pad 522, the supporting element 523, the first clamp plate 511, and the elbow plates 40, and then the oil filter tank will be assembled on the motor vehicle.

The restricting holes 113, the first restricting element 30A, and the second restricting element 30B can restrict the clamp plates 11 to move parallelly and mutually in order to maintain a stability of the present invention. The restricting holes 113 provide a further restricting effect to the clamp plates 11, such that elastic fatigue of the springs 13 can be prevented.

Figure 6:
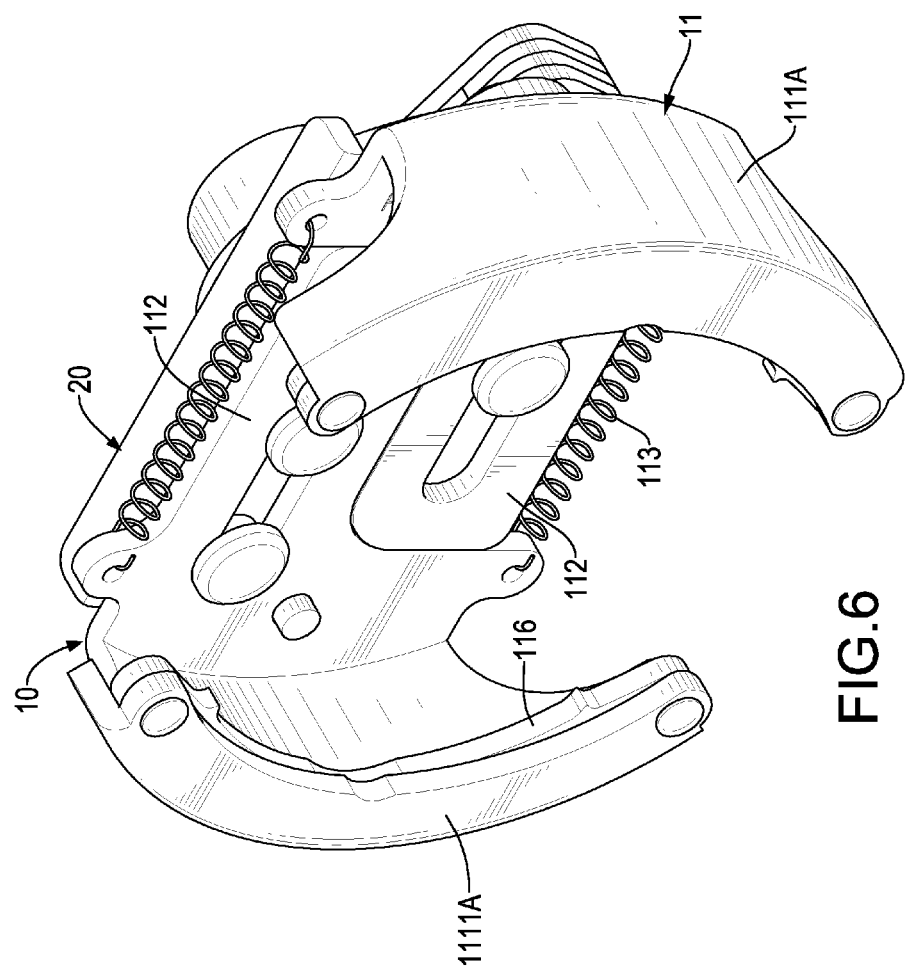
FIG. 6 is a perspective view of a second preferred embodiment of a device for assembling and disassembling an oil filter tank in accordance with the present invention.

The ratchet wheel 521, the brake pad 522, the supporting element 523 are mounted in the adapter 51 in sequence, and the adapter 51 is combined with the elbow plates 40. When the adapter 51 is connected with a wrench and is rotated by the wrench, the force rotating the wrench will be transferred to the clamp plates 11 through the rotating base 50, and an oil filter tank will be rotated clockwise for being assembled onto a vehicle. In the meantime, the ratchet wheel 521 will be idle counterclockwise, such that the clamp plates 11 clamp and rotate the oil filter tank clockwise, and the wrench pivots around on the rotating base 50 counterclockwise without affecting the clamp plates 11. As a result, the clamp plates 11 will be kept from detaching from the oil filter tank, and the present invention is convenient and timesaving. On the other hand, when the ratchet wheel 521 is idle clockwise, the operational direction of the wrench is in reverse. With reference to FIG. 6, a second preferred embodiment of a device for assembling and disassembling an oil filter tank in accordance with the present invention shows that the clamp edges 1111A of the clamp portions 111A can be designed in different types for different uses, and the clamp plates 11 further have two gripping plates 116 combined on the clamp edges 1111A to adjust clamping an oil filter tank of the clamp module 10. Alternatively, the clamp plates 11 only have a gripping plate 116 combined on one of the clamp edges 1111A.

Figure 7:
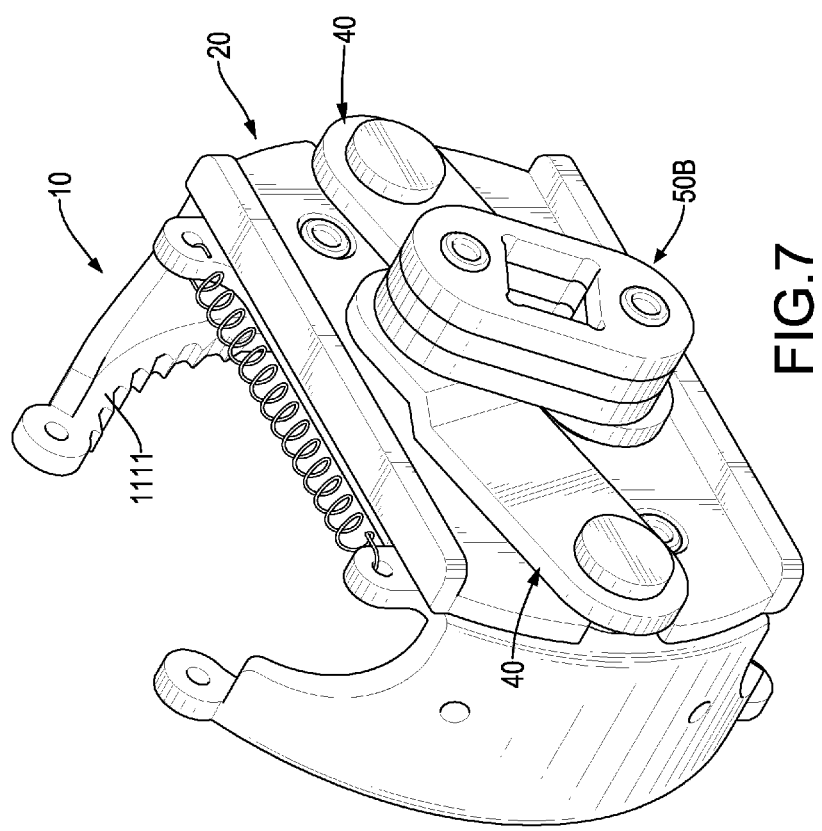
FIG. 7 is a perspective view of a third preferred embodiment of a device for assembling and disassembling an oil filter tank in accordance with the present invention.
Figure 8:
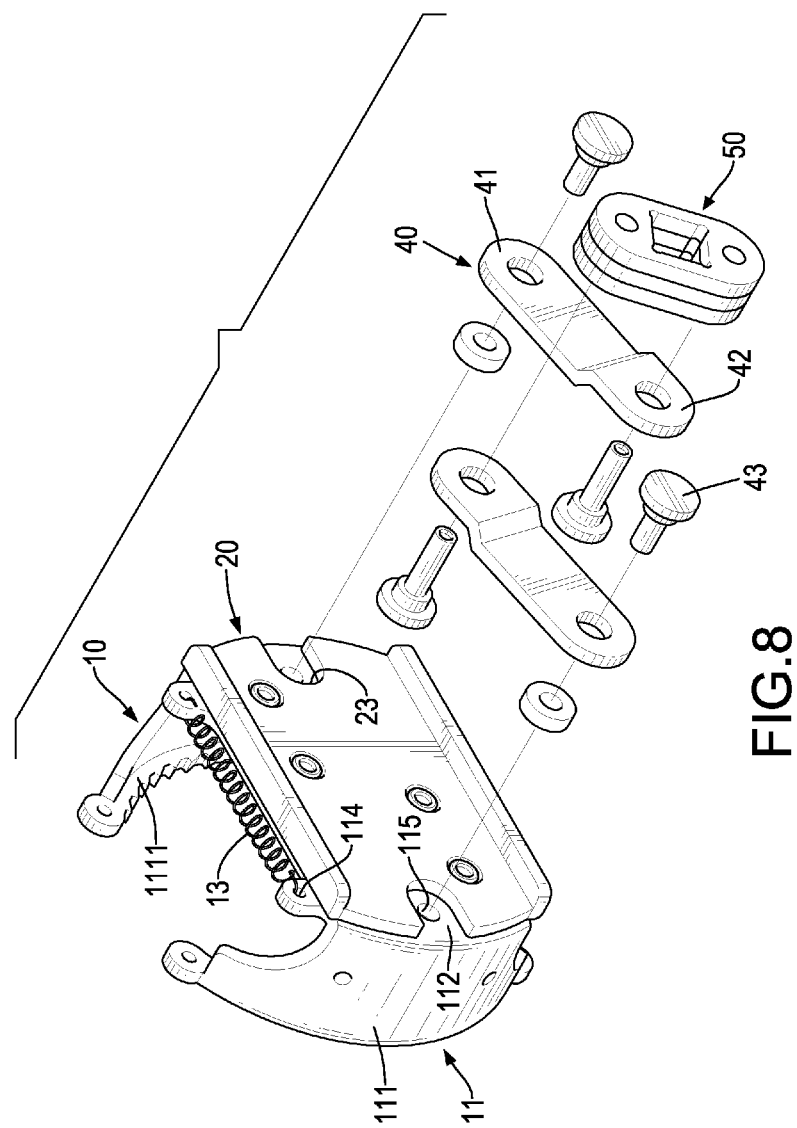
FIG. 8 is a partially exploded perspective view of the device in FIG. 7.

With reference to FIGS. 7 and 8, a third preferred embodiment of a device for assembling and disassembling an oil filter tank in accordance with the present invention shows that the rotating base 50B is rotatably combined on the pivoted ends 42 directly but the ratchet wheel module 52 is omitted. A wrench is inserted in the rotating base 50B to drive the elbow plates 40 and the clamp module 10.

What is claimed is:

1. A device for assembling and disassembling an oil filter tank comprising:
    a clamp module comprising
        two clamp plates, and each clamp plate having
            a clamp portion, wherein the clamp portions of the clamp plates face each other;
            a slipping portion being elongated and connected with an end of the clamp portion, wherein the slipping portions of the clamp plates parallelly extend and abut each other; and
            a restricting hole formed in and along a longitude of the slipping portion;
        a clamping space formed between the clamp portions; and
        at least one spring connected between the clamp plates, and a longitude of the at least one spring being parallel with the longitude of one of the slipping portions, and the slipping portions abutting each other by a force provided by the at least one spring;
    a base plate mounted on the clamp plates at a position opposite to the clamping space and having
        two first holes, wherein each first hole aligns with a middle segment of one of the restricting holes when the slipping portions abut each other;
    two first restricting elements, wherein each first restricting element is fixed in one of the first holes, is inserted slidably in a corresponding one of the restricting holes, and is engaged with a corresponding one of the slipping portions;
    two elbow plates being elongated and pivotally connected with the slipping portions respectively, and each elbow plate having
        a driving end pivotally connected to a corresponding one of the slipping portions;
        a pivoted end being opposite to the driving end; and
    a rotating base pivotally connected with the pivoted ends of the elbow plates and having
        an adapter mounted on a side of the rotating base at a position opposite to the elbow plates.

2. The device as claimed in claim 1, wherein
    the base plate further has two second holes, wherein each second hole is aligned with one of the restricting holes and corresponds to one end of a corresponding one of the restricting holes when the slipping portions abut each other; and
    two second restricting elements are inserted slidably in the restricting holes, respectively abut the slipping portions and are fixed in the second holes respectively.

3. The device as claimed in claim 2, wherein the clamp module has two springs, and one of the springs is located on a side of one of the slipping portions at a position opposite to the other slipping portion.

4. The device as claimed in claim 3, wherein the driving ends of the elbow plates are pivotally connected with the clamp plates by two combining bolts respectively, and the base plate has two bolt edges formed on the base plate and accommodating the combining bolts respectively.

5. The device as claimed in claim 4, wherein each clamp portion has a clamp edge mounted on the clamp portions at a position opposite to the slipping portion, and the clamp plates further have at least one gripping plate mounted on one of the clamp edges.

6. The device as claimed in claim 5, wherein the rotating base further has a ratchet wheel module mounted on the adapter.

7. The device as claimed in claim 6, wherein the ratchet wheel module has
    a ratchet wheel combined on the adapter;
    a brake pad mounted on the adapter and engaging the ratchet wheel; and
    a supporting element connected with the adapter and abutting the brake pad.

8. The device as claimed in claim 2, wherein the rotating base further has a ratchet wheel module mounted on the adapter.

9. The device as claimed in claim 8, wherein the ratchet wheel module has
    a ratchet wheel combined on the adapter;
    a brake pad mounted on the adapter and engaging the ratchet wheel; and
    a supporting element connected with the adapter and abutting the brake pad.

10. The device as claimed in claim 3, wherein the rotating base further has a ratchet wheel module mounted on the adapter.

11. The device as claimed in claim 4, wherein the rotating base further has a ratchet wheel module mounted on the adapter.

12. The device as claimed in claim 11, wherein the ratchet wheel module has
   a ratchet wheel combined on the adapter;
   a brake pad mounted on the adapter and engaging the ratchet wheel; and
   a supporting element connected with the adapter and abutting the brake pad.

13. The device as claimed in claim 10, wherein the ratchet wheel module has
   a ratchet wheel combined on the adapter;
   a brake pad mounted on the adapter and engaging the ratchet wheel; and
   a supporting element connected with the adapter and abutting the brake pad.

14. The device as claimed in claim 1, wherein each clamp portion has a clamp edge mounted on the clamp portion at a position opposite to the slipping portion, and the clamp plates further have at least one gripping plate mounted on one of the clamp edges.

15. The device as claimed in claim 14, wherein the rotating base further has a ratchet wheel module mounted on the adapter.

16. The device as claimed in claim 15, wherein the ratchet wheel module has
   a ratchet wheel combined on the adapter;
   a brake pad mounted on the adapter and engaging the ratchet wheel; and
   a supporting element connected with the adapter and abutting the brake pad.

17. The device as claimed in claim 1, wherein the rotating base further has a ratchet wheel module mounted on the adapter.

18. The device as claimed in claim 17, wherein the ratchet wheel module has
   a ratchet wheel combined on the adapter;
   a brake pad mounted on the adapter and engaging the ratchet wheel; and
   a supporting element connected with the adapter and abutting the brake pad.

* * * * *